United States Patent
Masuda

(10) Patent No.: US 11,829,754 B2
(45) Date of Patent: Nov. 28, 2023

(54) COMPILE DEVICE, COMPILE METHOD, AND NON-TRANSITORY COMPUTER READABLE MEDIUM FOR INCREASING A SPEED OF A PROGRAM

(71) Applicant: NEC Corporation, Tokyo (JP)

(72) Inventor: Koichi Masuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 365 days.

(21) Appl. No.: 17/299,039

(22) PCT Filed: Oct. 11, 2019

(86) PCT No.: PCT/JP2019/040150
§ 371 (c)(1),
(2) Date: Jun. 2, 2021

(87) PCT Pub. No.: WO2020/116025
PCT Pub. Date: Jun. 11, 2020

(65) Prior Publication Data
US 2022/0027151 A1    Jan. 27, 2022

(30) Foreign Application Priority Data
Dec. 7, 2018  (JP) .................. 2018-229695

(51) Int. Cl.
*G06F 9/30* (2018.01)
*G06F 8/41* (2018.01)
(52) U.S. Cl.
CPC .......... *G06F 9/3001* (2013.01); *G06F 8/4441* (2013.01); *G06F 9/30032* (2013.01); *G06F 9/30036* (2013.01); *G06F 9/30098* (2013.01)

(58) Field of Classification Search
None
See application file for complete search history.

(56) References Cited

U.S. PATENT DOCUMENTS

2014/0195778 A1    7/2014  Ould-Ahmed-Vall et al.
2016/0092400 A1*   3/2016  Yount ................. G06F 9/30032
                                                        712/7

FOREIGN PATENT DOCUMENTS

JP    H0962654 A      3/1997
JP    2000048009 A    2/2000
(Continued)

OTHER PUBLICATIONS

International Search Report of PCT Application No. PCT/JP2019/040150 dated Dec. 17, 2019.

*Primary Examiner* — Qing Chen

(57) ABSTRACT

A vector load instruction generating unit of a compile device generates an instruction to load a "first group of data units", which is used as an element A[i] in iterative calculation processing, from a memory into a first vector register in a state of being packed in units of 1-word. Each data unit is $(1/2)^k$ word. The vector load instruction generating unit generates an instruction to load a second group of data units, which is used as an element $[i+2^k]$ into a second vector register. A vector shift double instruction generating unit generates an instruction to cause a part of a data string, which is obtained by shifting data of the first vector Register and the second register by $(1/2)^k$ word as a series of data string, to be stored in a third vector register in a state of being packed in units of 1-word.

8 Claims, 14 Drawing Sheets

(56) References Cited

FOREIGN PATENT DOCUMENTS

| JP | 2012128790 A | 7/2012 |
|----|--------------|--------|
| JP | 2014526758 A | 10/2014 |
| JP | 2018049461 A | 3/2018 |

\* cited by examiner

```
void stencil(float *a,float *b){
 for (int i=0, i<n, i++)
  b[i]=a[i]+a[i+1]+a[i+2]+a[i+3]+a[i+4]
}
```

Fig. 3

```
SRL    sreg1, n,    1         ⎫
SMVL   sreg2                  ⎪
                              ⎬ P6-1
MIN    sreg3, sreg1, sreg2    ⎪
LVL    sreg3                  ⎭
VLD    vreg1, a[i]            ⎫
                              ⎬ P6-2
VLD    vreg2, a[i+2]          ⎭
VSRD   vreg3, vreg2, vreg1, 32  } P6-3
PVADD  vreg4, vreg2, vreg1    ⎫
                              ⎬ P6-4
PVADD  vreg5, vreg4, vreg3    ⎭
VLD    vreg6, a[i+4]          } P6-5
VSRD   vreg7, vreg6, vreg2, 32  } P6-6
PVADD  vreg8, vreg6, vreg5    ⎫
                              ⎬ P6-7
PVADD  vreg9, vreg8, vreg7    ⎭
VST    vreg9, b[i]            } P6-8
```

Fig. 6

```
SRL    sreg1, n,    2
SMVL   sreg2
MIN    sreg3, sreg1, sreg2
LVL    sreg3
VLD    vreg1, a[i]
VLD    vreg2, a[i+4]
VSRD   vreg3, vreg2, vreg1, 48
PVADD  vreg4, vreg2, vreg1
PVADD  vreg5, vreg4, vreg3
VSRD   vreg6, vreg2, vreg1, 32
PVADD  vreg7, vreg6, vreg5
VSRD   vreg8, vreg2, vreg1, 16
PVADD  vreg9, vreg8, vreg7
VST    vreg9, b[i]
```

Fig. 10

COMPILE DEVICE, COMPILE METHOD, AND NON-TRANSITORY COMPUTER READABLE MEDIUM FOR INCREASING A SPEED OF A PROGRAM

This application is a National Stage Entry of PCT/JP2019/040150 filed on Oct. 11, 2019, which claims priority from Japanese Patent Application 2018-229695 filed on Dec. 7, 2018, the contents of all of which are incorporated herein by reference, in their entirety.

TECHNICAL FIELD

The present disclosure relates to a compile device, a compile method, and a control program.

BACKGROUND ART

A compile device has been proposed that improves execution performance of a vector computer by converting adjacent memory access instructions existing in a source program into an object code in which a duplicated memory access is reduced (for example, Patent Literature 1). The compile device disclosed in Patent Literature 1 converts the adjacent memory access instructions into one memory access instruction. Further, the compile device generates an instruction to slide data of a first vector register loaded by the one memory access instruction and to store the data in a second vector register. Then, the compile device generates an instruction to perform an arithmetic operation on the data of the first vector register and the data of the second vector register.

CITATION LIST

Patent Literature

Patent Literature 1: Japanese Unexamined Patent Application Publication No. 2000-48009

SUMMARY OF INVENTION

Technical Problem

However, since the compiler device of Patent Literature 1 generates the instruction to slide the data of the first vector register and to store the data in the second vector register, elements used for the arithmetic operation may be deficient (see FIG. 4 in Patent Literature 1). In this case, the compiler device of Patent Literature 1 needs to generate additional vector instructions or scalar instructions for loading/storing and an arithmetic operation in order to make up for the deficient elements. In other words, the compiler device of Patent Literature 1 may not be able to speed up a program sufficiently due to insufficient optimization of the source program.

An object of the present disclosure is to provide a compile device, a compile method, and a control program capable of increasing a speed of a program.

Solution to Problem

A compile device according to a first aspect includes a compile processing unit configured to convert a primitive program for iteratively executing a calculation processing of executing an arithmetic calculation including, as operands, an element A[i], an element A[i+1], and an element [i+$2^k$] of an array A of a $(1/2)^k$ word type (k being a natural number) while shifting a value of a subscript i (i being an integer greater than or equal to 0) by one, into an object code, the compile processing unit including: a vector load instruction generating unit configured to generate a first vector load instruction to load a first group of data units, which is used as the element A[i] in the iterative calculation processing and has each data unit being a $(1/2)^k$ word, from a memory into a first vector register in a state of being packed in units of 1-word, as first vector data, and a second vector load instruction to load a second group of data units, which is used as the element A[i+$2^k$] in the iterative calculation processing, from the memory into a second vector register in a state of being packed in units of 1-word, as second vector data; and a vector shift instruction generating unit configured to generate a first vector shift double instruction to cause a part of a data string, which is obtained by shifting the first vector data and the second vector data by a $(1/2)^k$ word as a series of data string, to be stored in a third vector register in a state of being packed in units of 1-word, as third vector data corresponding to the element A[i+1].

A compile method according to a second aspect is a compile method of converting a primitive program for iteratively executing calculation processing of executing an arithmetic calculation including, as operands, an element A[i], an element A[i+1], and an element A[i+$2^k$] of an array A of a $(1/2)^k$ word type (k being a natural number) while shifting a value of a subscript i (i being an integer greater than or equal to 0) by one, into an object code, the compile method including: generating a first vector load instruction to load a first group of data units, which is used as the element A[i] in the iterative calculation processing and has each data unit being a $(1/2)^k$ word, from a memory into a first vector register in a state of being packed in units of 1-word, as first vector data, and a second vector load instruction to load a second group of data units, which is used as the element A[i+$2^k$] in the iterative calculation processing, from the memory into a second vector register in a state of being packed in units of 1-word, as second vector data; and generating a first vector shift double instruction to cause a part of a data string, which is obtained by shifting the first vector data and the second vector data by a $(1/2)^k$ word as a series of data string, to be stored in a third vector register in a state of being packed in units of 1-word, as third vector data corresponding to the element A[i+1].

A control program according to a third aspect is a control program for causing a compile device to execute compile processing for converting a primitive program for iteratively executing calculation processing of executing an arithmetic calculation including, as operands, an element A[i], an element A[i+1], and an element A[i+$2^k$] of an array A of a $(1/2)^k$ word type (k being a natural number) while shifting a value of a subscript i (i being an integer greater than or equal to 0) by one, into an object code, the compile processing including: generating a first vector load instruction to load a first group of data units, which is used as the element A[i] in the iterative calculation processing and has each data unit being a $(1/2)^k$ word, from a memory into a first vector register in a state of being packed in units of 1-word, as first vector data, and a second vector load instruction to load a second group of data units, which is used as the element A[i+$2^k$] in the iterative calculation processing, from the memory into a second vector register in a state of being packed in units of 1-word, as second vector data; and generating a first vector shift double instruction to cause a part of a data string, which is obtained by shifting the first vector data and the second vector data by a $(1/2)^k$ word as a series of data string, to be stored in a third vector register in a state of being packed in units of 1-word, as third vector data corresponding to the element A[i+1].

Advantageous Effects of Invention

According to the present disclosure, it is possible to provide a compile device, a compile method, and a control program capable of increasing a speed of a program.

BRIEF DESCRIPTION OF THE DRAWINGS

FIG. 3 is a view showing an example of a primitive program of the second example embodiment.

FIG. 6 is a view showing an example of an object code generated by the vectorization technique of the second example embodiment.

FIG. 10 is a view showing an example of an object code generated by the vectorization technique of the second example embodiment in a case of a 1/4 word type.

DESCRIPTION OF EMBODIMENTS

Figure 1:
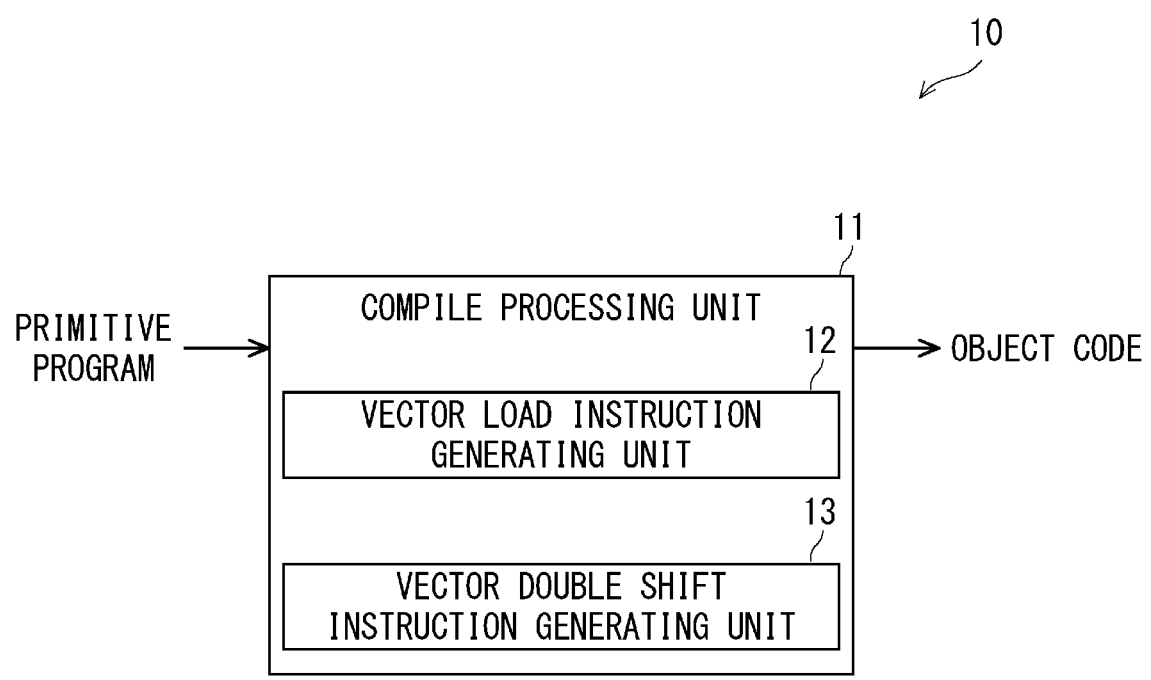
FIG. 1 is a block diagram showing an example of a compile device of a first example embodiment.

Example embodiments will be described below with reference to the drawings. In the example embodiments, the same or equivalent elements are denoted by the same reference numerals, and will not be repeatedly described.

First Example Embodiment

FIG. 1 is a block diagram showing an example of a compile device of a first example embodiment. In FIG. 1, a compile device 10 includes compile processing unit 11. The compile processing unit 11 converts a primitive program (source program) into an object code. The primitive program is a program for iteratively executing "calculation processing" of executing an arithmetic calculation including, as operands, an element a[i], an element a[i+1], and an element $a[i+2^k]$ of an array "a" of a $(1/2)^k$ word type while shifting a value of a subscript "i" by one. The symbol k represents a natural number, and the subscript i is an integer greater than or equal to 0. The above-described arithmetic calculation includes an "adjacent element calculation" of the array because the element a[i] and the element a[i+1] are adjacent to each other in the array. In the following description, the calculation processing iteratively executed may be referred to as "iterative calculation processing".

The compile processing unit 11 executes a "vectorization technique" of the first example embodiment. The compile processing unit 11 includes a vector load instruction generating unit 12 and a vector shift double instruction generating unit 13.

The vector load instruction generating unit 12 generates a first vector load instruction to load a "first group of data units" used as the element a[i] in the iterative calculation processing from a memory (not shown) into a first vector register in a state of being packed in units of 1-word. Each data unit is a $(1/2)^k$ word. Further, the vector load instruction generating unit 12 generates a second vector load instruction to load a second group of data units, which is used as the element $[i+2^k]$ in the iterative calculation processing, from the memory (not shown) into a second vector register in a state of being packed in units of 1-word. In the following description, the "first group of data units" and the "second group of data units" may be referred to as "first vector data" and "second vector data", respectively.

The vector shift double instruction generating unit 13 generates a vector shift double instruction to cause a part of a data string, which is obtained by shifting the first vector data and the second vector data by a $(1/2)^k$ word as a series of data string, to be stored in a third vector register in a state of being packed in units of 1-word. A part of the data string stored in the third vector register is "third vector data" corresponding to the element a[i+1].

According to the first example embodiment as described above, the compile device 10 includes the compile processing unit 11. In the compile processing unit 11, the vector load instruction generating unit 12 generates a first vector load instruction to load the "first group of data units", which is used as the element a[i] in the iterative calculation processing, from the memory (not shown) into the first vector register in a state of being packed in units of 1-word. Each data unit is a $(1/2)^k$ word. Further, the vector load instruction generating unit 12 generates a second vector load instruction to load a second group of data units, which is used as the element $[i+2^k]$ in the iterative calculation processing, from the memory (not shown) into a second vector register in a state of being packed in units of 1-word.

With the configuration of the compile device 10, since each of the register regions of the first vector register and the second vector register in units of 1-word can be filled with two packed data units, resource utilization efficiency of the registers can be improved.

In the compile processing unit 11, the vector shift double instruction generating unit 13 generates the vector shift double instruction to cause a part of the data string, which is obtained by shifting the first vector data and the second vector data by the $(1/2)^k$ word as a series of data string, to be stored in the third vector register in a state of being packed in units of 1-word.

With the configuration of the compile device 10, it is possible to generate third vector data including the same number of data units as the data units included in each of the first vector data and the second vector data. Thus, there is no shortage of elements used in the operation in the first vector data, the second vector data, and the third vector data. For this reason, it is not necessary to generate the instruction to load the deficient element as in Patent Literature 1 described above and the scalar instruction for calculating the data loaded by the instruction. As a result, the speed of the program can be increased.

Second Example Embodiment

Figure 2:
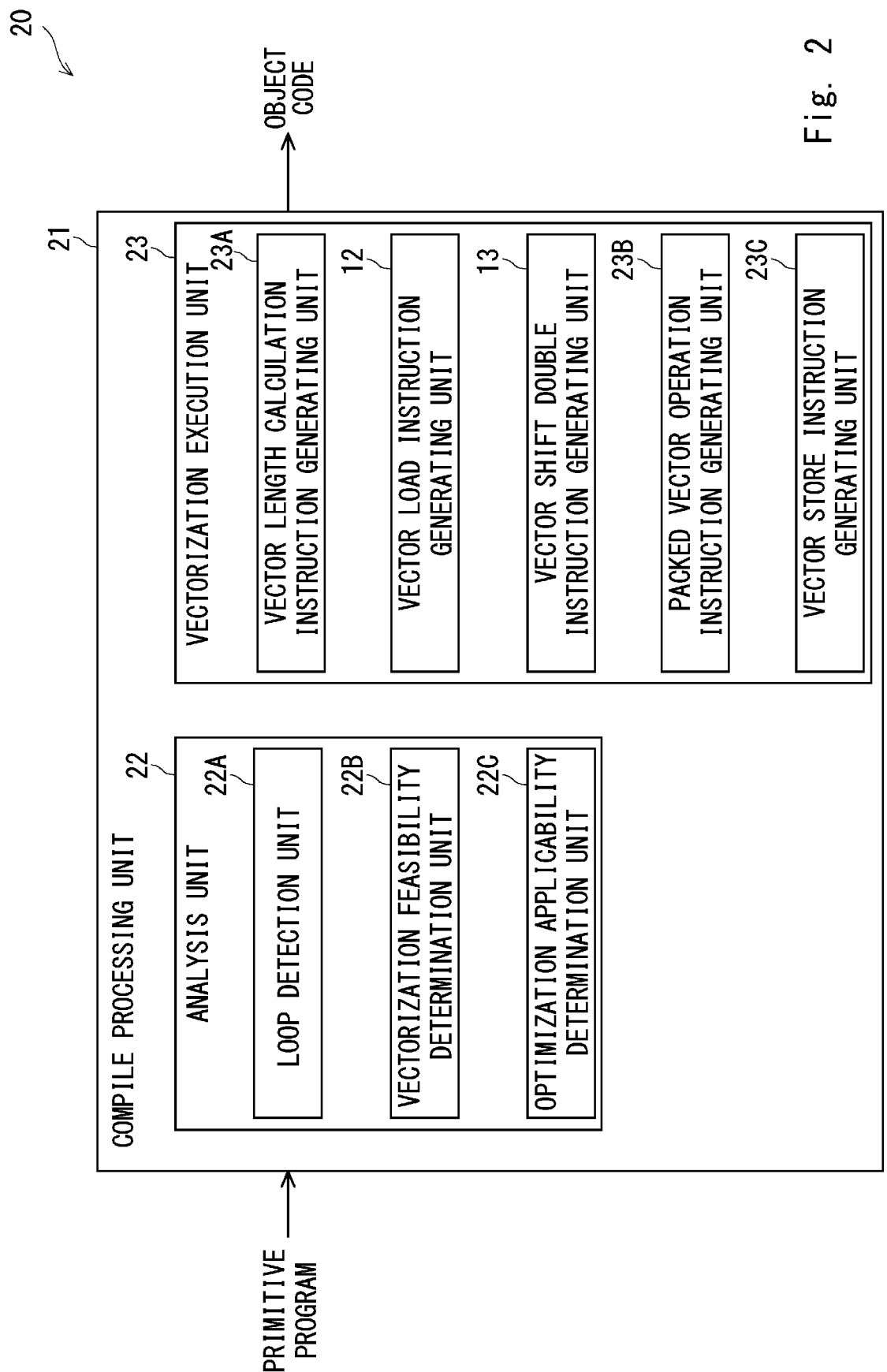
FIG. 2 is a block diagram showing an example of a compile device of a second example embodiment.

A second example embodiment will be described in more details.
<Configuration Example of Compile Device>
FIG. 2 is a block diagram showing an example of a compile device of a second example embodiment. In FIG. 2, a compile device 20 includes a compile processing unit 21. The compile processing unit 21 converts a primitive program (source program) into an object code as in the compile processing unit 11 of the first example embodiment. The compile processing unit 21 includes an analysis unit 22 and a vectorization execution unit 23.

The analysis unit 22 includes a loop detection unit 22A, a vectorization feasibility determination unit 22B, and an optimization applicability determination unit 22C.

The loop detection unit 22A detects a loop in the primitive program, and determines whether the detected loop includes the "calculation processing" as described above.

When the loop detected by the loop detection unit 22A includes the "calculation processing" as described above, the vectorization feasibility determination unit 22B determines whether the loop can be vectorized. As a "condition that can be vectorized", for example, a conventional condition, that is, "the definition and the reference relationship of arrays and variables in the loop have no dependency that hinders vectorization" can be used.

The optimization applicability determination unit 22C determines whether a "vectorization technique" of the second example embodiment can be applied to the "calculation processing" described above. For example, the optimization applicability determination unit 22C determines that the "vectorization technique" of the second example embodiment can be applied to the "calculation processing" described above when all of the following first condition, second condition, and third condition are satisfied.
  (First Condition) The array is a $(1/2)^k$ word type.
  (Second Condition) All of array elements to be calculated are adjacent to each other in one iteration, that is, the "calculation processing" described above.
  (Third Condition) The number of array elements used in the calculation is "$m \times 2^k + 1$" in one iteration, that is, the "calculation processing" described above. Here, m is any natural number.

When the primitive program is, for example, a program shown in FIG. 3, the determination of the loop detection unit 22A and the vectorization feasibility determination unit 22B is a positive determination. Further, when the primitive program is, for example, the program shown in FIG. 3, the determination of the optimization applicability determination unit 22C is also a positive determination. That is, in the program shown in FIG. 3, the array is a half-word type (k=1), and subscripts of the array elements to be calculated are [i], [i+1], [i+2], [i+3], and [i+4], which are shifted by one. Further, in the program shown in FIG. 3, the number of array elements used in the calculation in one iteration is 5 ($=2\times2^1+1$) elements. Therefore, the program shown in FIG. 3 satisfies all of the first condition, the second condition, and the third condition described above. FIG. 3 is a view showing an example of the primitive program of the second example embodiment.

The vectorization execution unit 23 executes the "vectorization technique" of the second example embodiment on the primitive program for which the positive determination is made by the loop detection unit 22A, the vectorization feasibility determination unit 22B, and the optimization applicability determination unit 22C.

The vectorization execution unit 23 includes a vector length calculation instruction generating unit 23A, a vector load instruction generating unit 12, a vector shift double instruction generating unit 13, a packed vector operation instruction generating unit 23B, and a vector store instruction generating unit 23C.

The vector length calculation instruction generating unit 23A generates an SRL (Shift Right Logical) instruction to acquire a "loop length N" and to calculate $N\times(1/2)^k$ with a right logic shift operation. In addition, the vector length calculation instruction generating unit 23A generates an SMVL (Store Max Vector Length) instruction to acquire a "maximum vector length" allowed by the system. Further, the vector length calculation instruction generating unit 23A generates an MIN (Minimum) instruction to select a smaller one of the value calculated by the SRL instruction and the "maximum vector length" in comparison with each other and an LVL (Load Vector Length) instruction to set the selected value as a "vector length". In the case of the program shown in FIG. 3, the vector length calculation instruction generating unit 23A is configured to acquire a loop length n, and to generate instructions in which a smaller one of the $n\times(1/2)^1$ and the maximum vector length in comparison with each other is set as the vector length.

The vector load instruction generating unit 12 generates (m+1) VLD (Vector Load) instructions to load $2^k$ data units (that is, 1-word data unit) as one packed data into different vector registers in a form of 1-word vector, respectively. In these (m+1) VLD instructions, a position where the data unit is started to be loaded from the memory (not shown), that is, a "vector load start position" is shifted from each other by 2k elements (that is, the number of elements for 1 word).

The vector shift double instruction generating unit 13 generates (2k−1) VSRD (Vector Shift Double Right) instructions to shift by a "predetermined shift amount" for each pair of the groups of data units, the groups of each pair having "vector load start positions" closest to each other. Each pair of the groups of data units, the groups of each pair having "vector load start positions" closest to each other, described above is each pair of the groups of data units in which a vector load start position of one group is shifted from a vector load start position of other group by the number of elements for 1-word. Each of the (2k−1) VSRD instructions has a "predetermined shift amount" of $1\times(1/2)^k$ words (1 being a natural number from 1 to (2k−1)).

The VSRD instruction is the following instruction.
  "VSRD % v0, % v1, % v2, S"
Here, the symbol % v0 means a 1-word vector register to which an operation result is written. The symbols % v1 and % v2 mean vector register that are operands for an operation. The symbol S is a scalar value from 0 to (2-word−1) that specifies the shift amount. In other words, according to the VSRD instruction, two vector registers, which are operands, are combined to form 2-word data (that is, a series data string), and a lower-side 1-word value of the 2-word data obtained in such a manner that the 2-word data is subjected to a right-shift operation by S is written to the vector register as the operation result.

The packed vector operation instruction generating unit 23B generates a PVOP (Packed Vector Operation) instruction to perform an operation on the vector-loaded vector data and the vector data generated by the vector shift double. Here, specifically, the generated PVOP instruction is an instruction according to the arithmetic calculation mode described above. For example, in the example of the primitive program shown in FIG. 3, since the arithmetic calculation is addition between elements, the generated PVOP instruction is a PVADD (Packed Vector ADD) instruction, specifically.

The vector store instruction generating unit 23C generates a VST (Vector Store) instruction to perform a 1-word vector store on the operation result obtained by the PVOP instruction, as packed data of 2k elements.

<Example of Processing Operation of Compile Device>

An example of processing operation of the compile device 20 having the configuration described above will be described.

<Analysis Processing as to Whether Vectorization Technique of Second Example Embodiment is Applicable>

Figure 4:
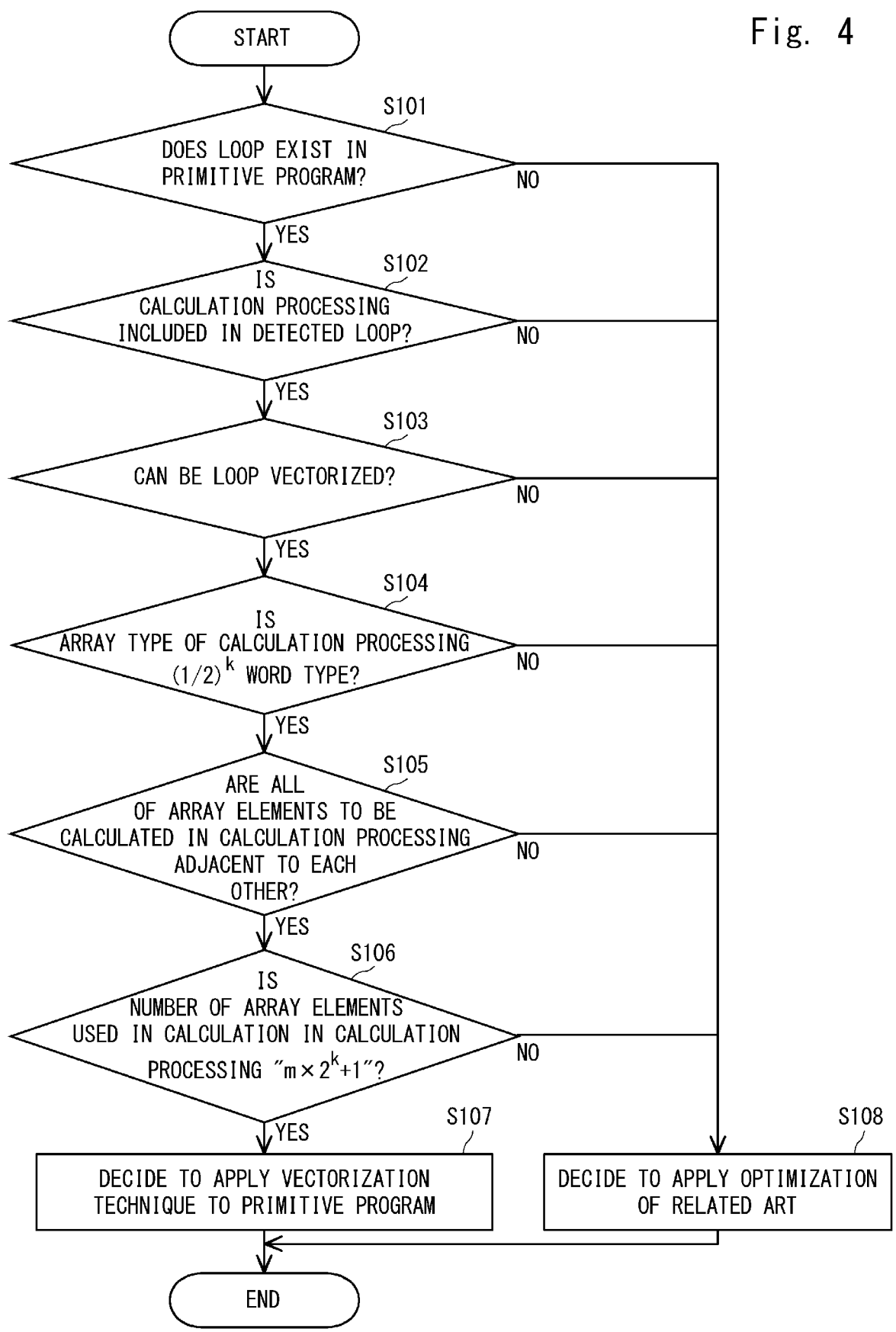
FIG. 4 is a flowchart showing an example of analysis processing as to whether a vectorization technique is applicable by the compile device of the second example embodiment.

FIG. 4 is a flowchart showing an example of analysis processing as to whether the vectorization technique is applicable by the compile device of the second example embodiment.

In the compile device 20, the analysis unit 22 determines whether a loop exists in the primitive program (step S101).

When the loop exists in the primitive program (step S101, YES), the analysis unit 22 determines whether calculation processing is included in the detected loop (step S102).

When the calculation processing is included in the loop (step S102, YES), the analysis unit 22 determines whether the loop can be vectorized (step S103). As described above, as the "condition that can be vectorized", for example, the conventional condition, that is, "the definition and the reference relationship of arrays and variables in the loop have no dependency that hinders vectorization" can be used.

When it is determined that the loop can be vectorized (step S103, YES), the analysis unit 22 determines whether the array type of the calculation processing is a $(1/2)^k$ word type (step S104).

When the array type of the calculation processing is the $(1/2)^k$ word type (step S104, YES), the analysis unit 22 determines whether all of the array elements to be calculated in the calculation processing ae adjacent to each other (step S105).

When all of the array elements to be calculated in the calculation processing ae adjacent to each other (step S105, YES), the analysis unit 22 determines whether the number of array elements used in the calculation in the calculation processing is "$m \times 2^{k+1}$" (step S106).

When the number of array elements used in the calculation in the calculation processing is "$m \times 2^k + 1$" (step S106, YES), the analysis unit 22 decides to apply the vectorization technique of the second example embodiment to the primitive program (step S107).

When a negative determination is made in any of steps S101 to step S106, the analysis unit 22 decides to apply the optimization of the related art, for example (step S108).

<Vectorization Technique of Second Example Embodiment>

Figure 5:
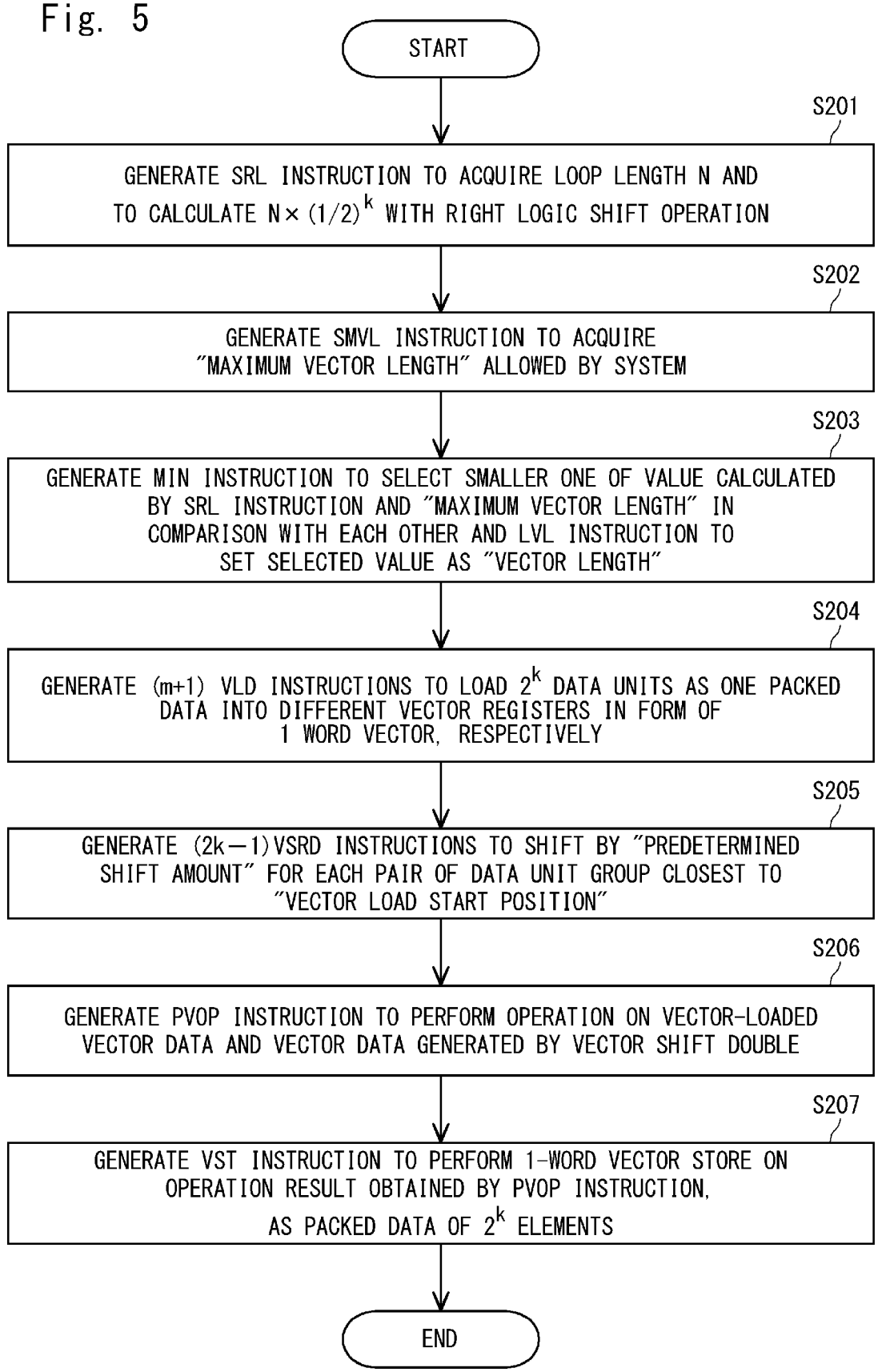
FIG. 5 is a flowchart showing an example of the vectorization technique by the compile device of the second example embodiment.

FIG. 5 is a flowchart showing an example of the vectorization technique by the compile device of the second example embodiment. The processing flow of FIG. 5 starts when the analysis unit 22 decides to apply the vectorization technique of the second example embodiment to the primitive program.

In the compile device 20, the vectorization execution unit 23 generates an SRL instruction to acquire a loop length N and to calculate $N \times (1/2)^k$ with a right logic shift operation (step S201). When the primitive program is the program shown in FIG. 3, an instruction shown in a first row of an object code part P6-1 shown in FIG. 6 is generated. FIG. 6 is a view showing an example of an object code generated by the vectorization technique of the second example embodiment.

The vectorization execution unit 23 generates an SMVL instruction to acquire a "maximum vector length" allowed by the system (step S202).

The vectorization execution unit 23 generates an MIN (Minimum) instruction to select a smaller one of the value calculated by the SRL instruction and the "maximum vector length" in comparison with each other and an LVL (Load Vector Length) instruction to set the selected value as a "vector length" (step S203). When the primitive program is the program shown in FIG. 3, the object code part P6-1 shown in FIG. 6 is generated by steps S201 to step S203.

Figure 7:
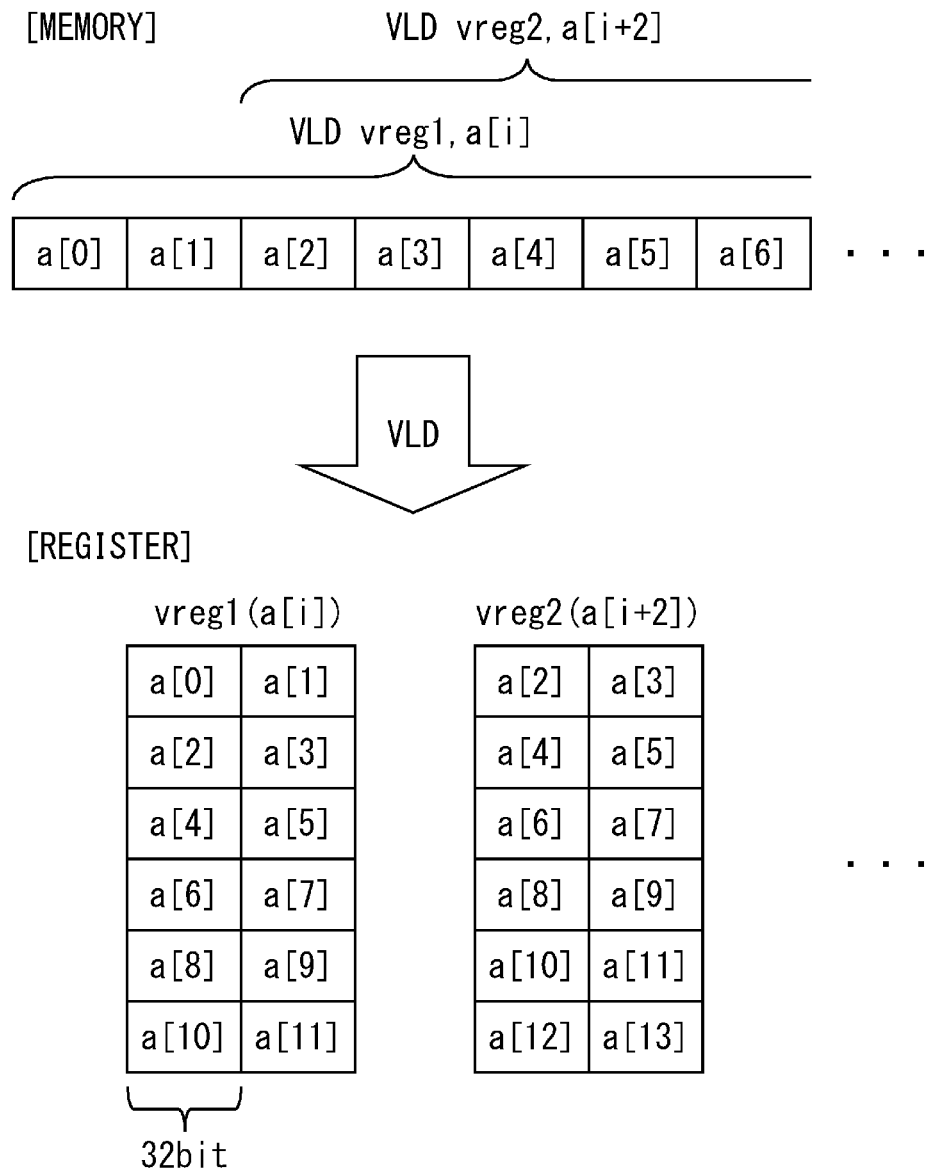
FIG. 7 is a view used to describe a vector load instruction generated by the vectorization technique of the second example embodiment.

The vectorization execution unit 23 generates (m+1) VLD instructions to load 2k data units as one packed data into different vector registers in a form of 1-word vector, respectively (step S204). In these (m+1) VLD instructions, a position where the data unit is started to be loaded from the memory (not shown) is shifted from each other by 2k elements (that is, the number of elements for 1 word). When the primitive program is the program shown in FIG. 3, object code parts P6-2 and P6-5 shown in FIG. 6 are generated. In the program shown in FIG. 3, since the array is a half-word type (that is, k=1) and the number of elements is 5 (that is, m=2), three VLD instructions are generated. In addition, targets of the load instruction are a[i], a[i+2], and a[i+4], and these load start positions are shifted by two elements from each other. For example, when the object code part P6-2 shown in FIG. 6 is executed, processing as shown in FIG. 7 is executed. In other words, a "VLD vreg1, a[i]" is executed, and thus a plurality of data units a[0] to a[11] are loaded into a vector register vreg1 in a state where the vector load start position is set to a[0] and two data units are packed into one. In other words, the data units a[0], a[2], a[4], a[6], a[8], and a[10] are loaded in upper regions of respective register regions in units of 1-word of the vector register vreg1, and the data units a[1], a[3], a[5], a[7], a[9], and a[11] are loaded in lower regions. In addition, a "VLD vreg1, a[i+2]" is executed, and thus a plurality of data units a[2] to a[13] are loaded into a vector register vreg2 in a state where the vector load start position is set to a[2] and two data units are packed into one. FIG. 7 is a view used to describe the vector load instruction generated by the vectorization technique of the second example embodiment.

Figure 8:
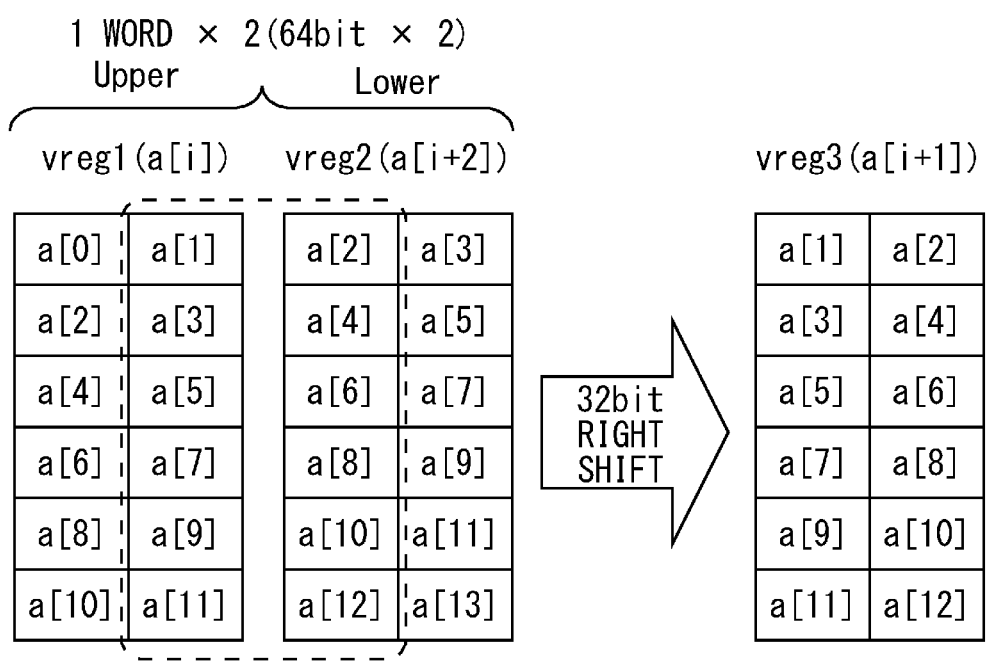
FIG. 8 is a view used to describe a vector shift double instruction generated by the vectorization technique of the second example embodiment.

Returning to the description of FIG. 5, the vectorization execution unit 23 generates (2k-1) VSRD instructions to shift by a "predetermined shift amount" for each pair of the groups of data units, the groups of each pair having "vector load start positions" closest to each other (step S205). Each of the (2k-1) VSRD instructions has a "predetermined shift amount" of $I \times (1/2)^k$ words (I being a natural number from 1 to (2k-1)). When the primitive program is the program shown in FIG. 3, the object code parts P6-3 and P6-6 shown in FIG. 6 are generated. In other words, the part P6-3 is generated for a pair of a[i] and a[i+2], and the part P6-6 is generated for a pair of a[i+2] and a[i+4]. In the program shown in FIG. 3, since the array is the half-word type (that is, k=1), one VSRD instruction is generated for each pair, and the predetermined shift amount is 1/2 word. For example, when the object code part P6-3 shown in FIG. 6 is executed, processing as shown in FIG. 8 is executed. In other words, vector registers vreg1 and vreg2, which are operands of the VSRD instruction, are combined to form 2-word data, and a lower-side 1-word value of the 2-word data obtained in such a manner that the 2-word data is subjected to a right-shift operation by 1/2 word is written to the vector register vreg3. The plurality of data units written to the vector register vreg3 correspond to the a[i+1]. FIG. 8 is a view used to describe the vector shift double instruction generated by the vectorization technique of the second example embodiment.

Figure 9:
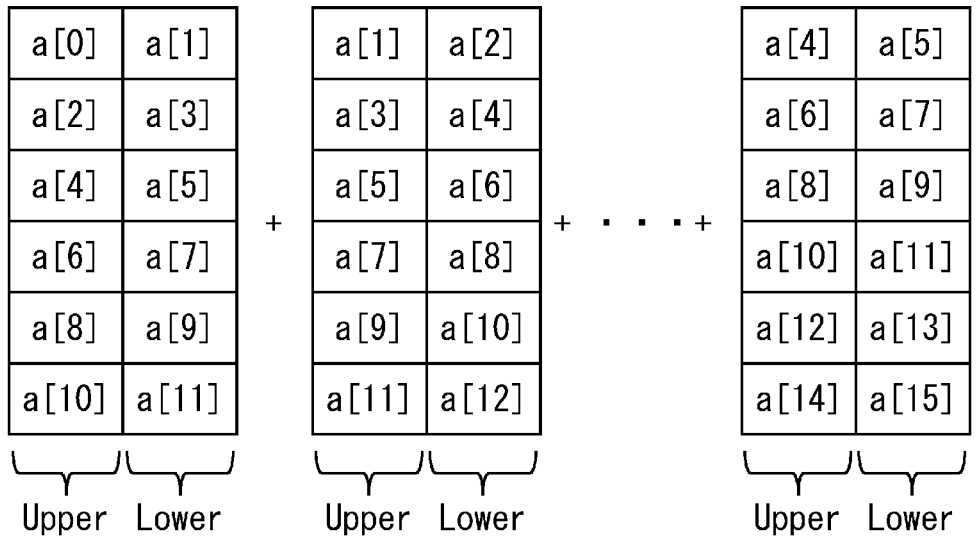
FIG. 9 is a view used to describe a packed vector operation instruction generated by the vectorization technique of the second example embodiment.

Returning to the description of FIG. 5, the vectorization execution unit 23 generates a PVOP instruction to perform an operation on the vector-loaded vector data and the vector data generated by the vector shift double (step S206). When the primitive program is the program shown in FIG. 3, object code parts P6-4 and P6-7 shown in FIG. 6 are generated. In other words, since the calculation formula of the program shown in FIG. 3 includes four addition operators, four PVOP instructions are generated. When the object code parts P6-4 and P6-7 shown in FIG. 6 are executed, as shown in FIG. 9, addition processing is performed separately for upper regions and lower regions of respective register regions in units of 1-word of vector registers vreg1, vreg2, vreg3, vreg6, and vreg7. FIG. 9 is a view used to describe the packed vector operation instruction generated by the vectorization technique of the second example embodiment.

Returning to the description of FIG. 5, the vectorization execution unit 23 generates a VST instruction to perform a 1-word vector store on the operation result obtained by the PVOP instruction, as packed data of 2k elements (step S207). From the operation result by the PVOP instruction shown in FIG. 9, it can be seen that each of upper regions and lower regions in respective register regions retains the calculation result obtained in each calculation processing of the "iterative calculation processing" described above.

In the above description, the case of the 1/2 word type is described as an example, but the "vectorization technique" described above is also applicable to a 1/4 word type and a 1/8 word type as a matter of course without being limited thereto.

For example, in the case of the 1/4 word type, the primitive program shown in FIG. 3 is converted into an object code shown in FIG. 10. FIG. 10 is a view showing an example of an object code generated by the vectorization technique of the second example embodiment in the case of the 1/4 word type.

Figure 11:
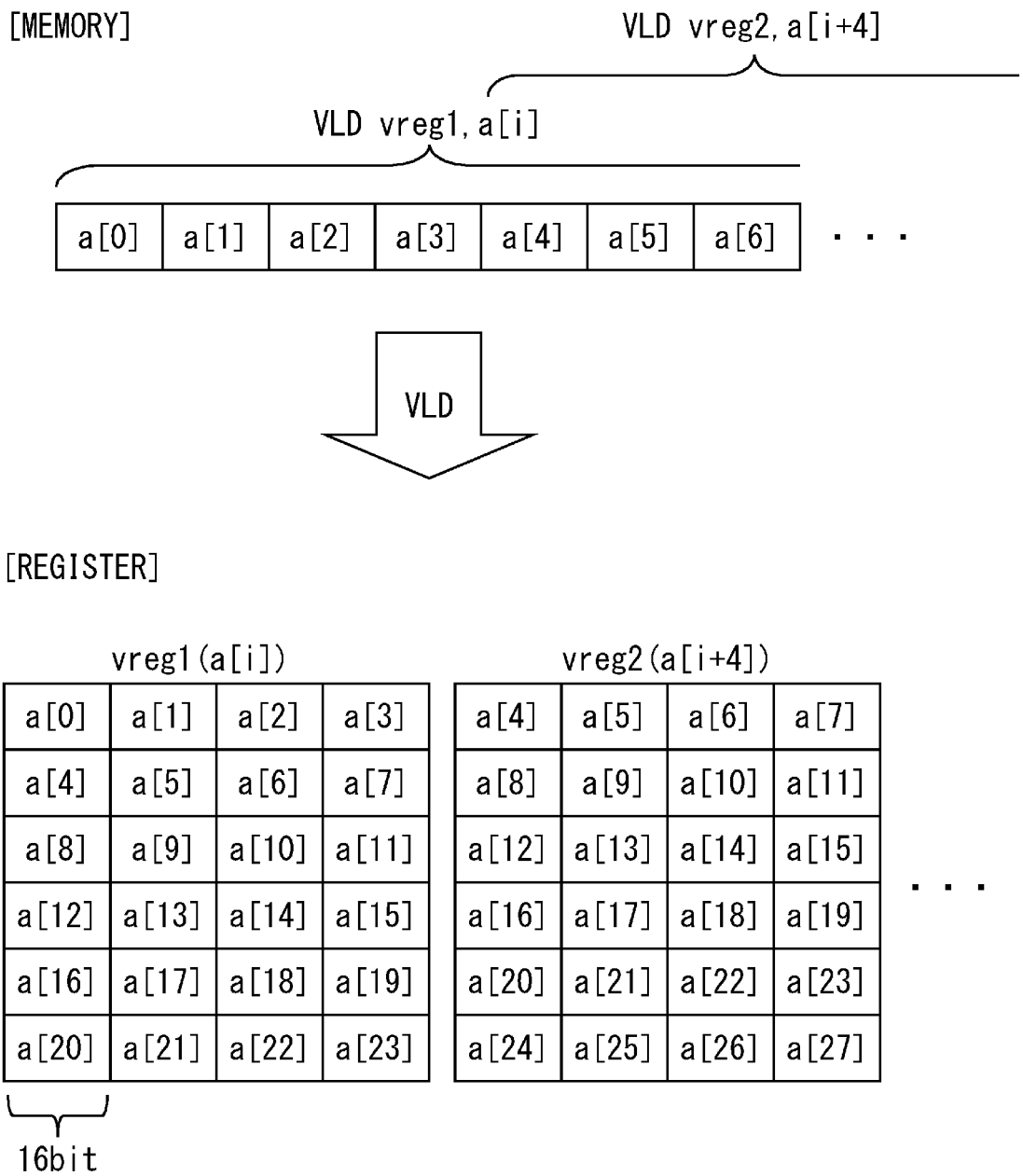
FIG. 11 is a view used to describe a vector load instruction generated by the vectorization technique of the second example embodiment in the case of the 1/4 word type.

Specifically, since the array is a 1/4 word type (that is, k=2) and the number of elements is 5 (that is, m=1) in step S204, two VLD instructions are generated. The targets of the load instruction are a[i] and a[i+4], and load start positions are shifted by 4 elements from each other. When the two VLD instructions are executed, processing as shown in FIG. 11 is executed. In other words, a "VLD vreg1, a[i]" is executed, and thus a plurality of data units a[0] to a[23] are loaded into a vector register vreg1 in a state where a vector load start position is set to a[0] and four data units are packed into one. Here, each row in the vector register vreg1 of FIG. 11 corresponds to a "register region" in units of 1-word, and each of four columns in each row corresponds to a "partial region" corresponding to a 1/4 word. In addition, a "VLD vreg1, a[i+4]" is executed, and thus a plurality of data units a[4] to a[27] are loaded into a vector register vreg2 in a state where a vector load start position is set to a[4] and four data units are packed into one. FIG. 11 is a view used to describe a vector load instruction generated by the vectorization technique of the second example embodiment in the case of the 1/4 word type.

Figure 12:
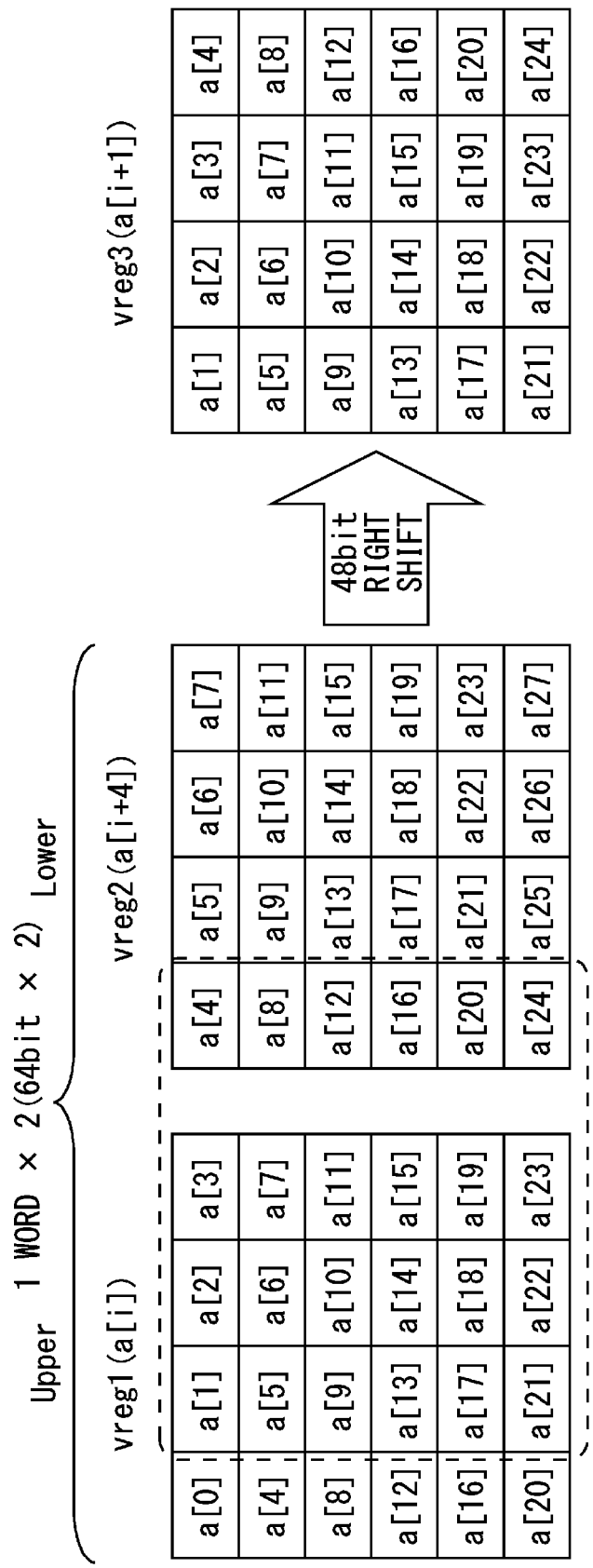
FIG. 12 is a view used to describe a vector shift double instruction generated by the vectorization technique of the second example embodiment in the case of the 1/4 word type.

In step S205, the three VSRD instructions respectively having a "predetermined shift amount" of 1/4 word type, 2/4 word type, and 3/4 word type are generated for a pair of a[i] and a[i+4]. When a VSRD instruction "VSRD vreg3, vreg2, vreg1, 48" having the "predetermined shift amount" of 3/4 word type is executed for the pair of a[i] and a[i+4], vector registers vreg1 and vreg2, which are operands of the VSRD instruction, are combined to form 2-word data. Then, a lower-side 1-word value of the 2-word data obtained in such a manner that the 2-word data is subjected to a right-shift operation by 3/4 word is written to the vector register vreg3. The plurality of data units written to the vector register vreg3 correspond to the a[i+1]. FIG. 12 is a view used to describe the vector shift double instruction generated by the vectorization technique of the second example embodiment in the case of the 1/4 word type.

Figure 13:
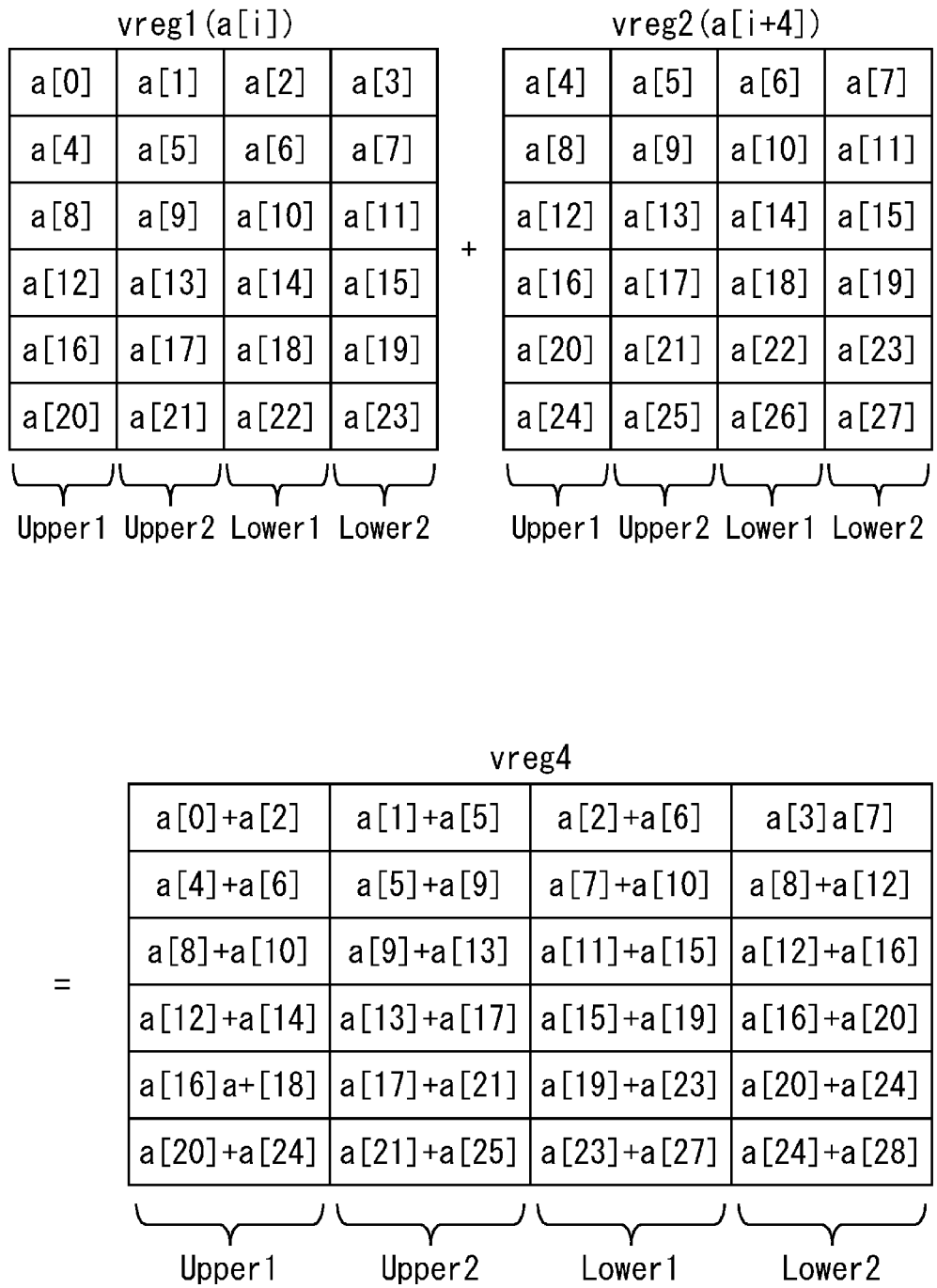
FIG. 13 is a view used to describe a packed vector operation instruction generated by the vectorization technique of the second example embodiment in the case of the 1/4 word type.

In step S206, the PVOP instruction is generated to perform an operation on the vector-loaded vector data and the vector data generated by the vector shift double. For example, a vector addition operation of a[i] and a[i+4] is added in units of the "partial region" described above as shown in FIG. 13. FIG. 13 is a view used to describe the packed vector operation instruction generated by the vectorization technique of the second example embodiment in the case of the 1/4 word type.

As described above, when the array "a" is a 1/4 word type, the vectorization execution unit 23 (vector shift double instruction generating unit 13) generates: the first vector shift double instruction to cause a part of a data string, which is obtained by shifting the series data string (that is, the above-described 2-word data) by a 3/4 word, to be stored in the third vector register, as the third vector data; a second vector shift double instruction to cause a part of a data string, which is obtained by shifting the series data string by a 2/4 word, to be stored in a fourth vector register in a state of being packed in units of 1-word, as fourth vector data corresponding to the element A[i+2]; and a third vector shift double instruction to cause a part of a data string, which is obtained by shifting the series data string by a 1/4 word, to be stored in a fourth vector register in a state of being packed in units of 1-word, as fourth vector data corresponding to the element A[i+3].

The same applies when the array "a" is a 1/8 word type. In other words, when the array a is the 1/8 word type, the vector shift double instruction generating unit 13 generates: the first vector shift double instruction to cause a part of a data string, which is obtained by shifting the series data string (that is, the above-described 2-word data) by a 7/8 word, to be stored in the third vector register, as the third vector data; a second vector shift double instruction to cause a part of a data string, which is obtained by shifting the series data string by a 6/8 word, to be stored in a fourth vector register in a state of being packed in units of 1-word, as fourth vector data corresponding to the element A[i+2]; a third vector shift double instruction to cause a part of a data string, which is obtained by shifting the series data string by a 5/8 word, to be stored in a fourth vector register in a state of being packed in units of 1-word, as fourth vector data corresponding to the element A[i+3]; a fourth vector shift double instruction to cause a part of a data string, which is obtained by shifting the series data string by a 4/8 word, to be stored in a fifth vector register in a state of being packed in units of 1-word, as fifth vector data corresponding to the element A[i+4]; a fifth vector shift double instruction to cause a part of a data string, which is obtained by shifting the series data string by a 3/8 word, to be stored in a sixth vector register in a state of being packed in units of 1-word, as sixth vector data corresponding to the element A[i+5]; a sixth vector shift double instruction to cause a part of a data string, which is obtained by shifting the series data string by a 2/8 word, to be stored in a seventh vector register in a state of being packed in units of 1-word, as seventh vector data corresponding to the element A[i+6]; and a seventh vector shift double instruction to cause a part of a data string, which is obtained by shifting the series data string by a 1/8 word, to be stored in an eighth vector register in a state of being packed in units of 1-word, as eighth vector data corresponding to the element A[i+7].

Other Example Embodiments

Figure 14:
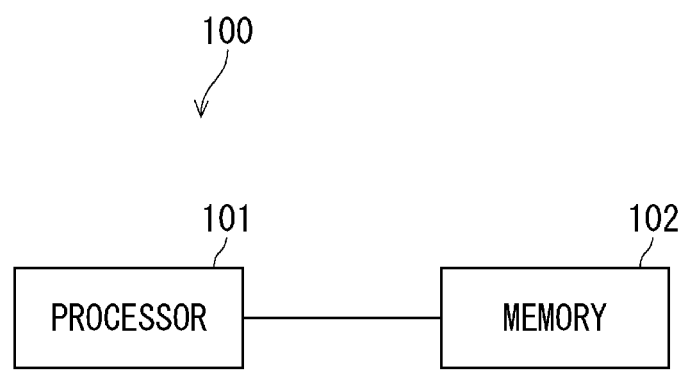
FIG. 14 is a diagram showing a configuration example of hardware of a compile device

FIG. 14 is a diagram showing a configuration example of hardware of a compile device. In FIG. 14, a compile device 100 includes a processor 101 and a memory 102. The compile processing units 11 and 21 of the compile devices 10 and 20 of the first example embodiment and the second example embodiment may be realized, respectively, when the processor 101 reads and executes the program stored in the memory 102. The program is stored using various types of non-transitory computer readable media and can be supplied to the compile device 10 or 20. In addition, the program may be supplied to the compile device 10 or 20 using various types of transitory computer readable media.

Although the invention of the present application has been described above with reference to the example embodiments, the invention of the present application is not limited to the example embodiments. Various changes that can be understood by those skilled in the art can be made within the scope of the invention in the configuration and details of the invention of the present application.

This application is based upon and claims the benefit of priority from Japanese Patent Application No. 2018-229695, filed on Dec. 7, 2018, the entire contents of which are incorporated herein by reference.

REFERENCE SIGNS LIST 10, 20 compile device
11, 21 compile processing unit
12 vector load instruction generating unit
13 vector shift double instruction generating unit
22 analysis unit
22A loop detection unit
22B vectorization feasibility determination unit
22C optimization applicability determination unit
23 vectorization execution unit
23A vector length calculation instruction generating unit
23B packed vector operation instruction generating unit
23C vector store instruction generating unit

What is claimed is:

1. A compile device comprising:
hardware including at least one processor and at least one memory; and
a compile processing unit implemented at least by the hardware and that converts a primitive program for iterative calculation processing of executing an arithmetic calculation including, as operands, an element A[i], an element A[i+1], and an element $[i+2^k]$ of an array A of a $(1/2)^k$ word type (k being a natural number) while shifting a value of a subscript i (i being an integer greater than or equal to 0) by one, into an object code,
the compile processing unit including:
a vector load instruction generating unit configured to generate a first vector load instruction to load a first group of data units, which is used as the element A[i] in the iterative calculation processing of executing the arithmetic calculation and has each data unit being a $(1/2)^k$ word, from a memory into a first vector register in a state of being packed in units of 1-word, as first vector data, and a second vector load instruction to load a second group of data unit, which is used as the element $A[i+2^k]$ in the iterative calculation processing of executing the arithmetic calculation, from the memory into a second vector register in a state of being packed in units of 1-word, as second vector data; and
a vector shift instruction generating unit configured to generate a first vector shift double instruction to cause a part of a data string, which is obtained by shifting the first vector data and the second vector data by a $(1/2)^k$ word as a series of data string, to be stored in a third vector register in a state of being packed in units of 1-word, as third vector data corresponding to the element A[i+1].

2. The compile device according to claim 1, wherein:
the compile processing unit further includes a condition determination unit configured to determine whether a condition is satisfied that the vector load instruction generating unit starts a process of generating the first vector load instruction and the second vector load instruction and the vector shift instruction generating unit starts a process of generating the first vector shift double instruction, and
the condition includes a condition that subscripts of all of elements to be calculated in each of the iterative calculation processing of executing the arithmetic calculation are continuous.

3. The compile device according to claim 1, wherein:
the compile processing unit further includes a vector length calculation instruction generating unit configured to generate, when the iterative calculation processing of executing the arithmetic calculation is executed iteratively N (N being a natural number greater than or equal to 2) times, a vector length calculation instruction to select a smaller one of the $N \times (1/2)^k$ and a maximum vector length allowed by a system, as a vector length, and
the vector load instruction generating unit is further configured to generate the first vector load instruction and the second vector load instruction to load the first vector data and the second vector data including the vector length, respectively.

4. The compile device according to claim 1, wherein when the array A is a 1/2 word type, the vector shift instruction generating unit is further configured to generate the first vector shift double instruction to cause a part of a data string, which is obtained by shifting the series of data string by a 1/2 word, to be stored in the third vector register, as the third vector data.

5. The compile device according to claim 1, wherein when the array A is a 1/4 word type, the vector shift instruction generating unit is further configured to generate:
the first vector shift double instruction to cause a part of a data string, which is obtained by shifting the series of data string by a 3/4 word, to be stored in the third vector register, as the third vector data;

a second vector shift double instruction to cause a part of a data string, which is obtained by shifting the series of data string by a 2/4 word, to be stored in a fourth vector register in a state of being packed in units of 1-word, as fourth vector data corresponding to an element A[i+2]; and a third vector shift double instruction to cause a part of a data string, which is obtained by shifting the series of data string by a 1/4 word, to be stored in a fourth vector register in a state of being packed in units of 1-word, as fourth vector data corresponding to an element A[i+3].

6. The compile device according to claim 1, wherein when the array A is a 1/8 word type, the vector shift instruction generating unit is further configured to generate:

the first vector shift double instruction to cause a part of a data string, which is obtained by shifting the series of data string by a 7/8 word, to be stored in the third vector register, as the third vector data;

a second vector shift double instruction to cause a part of a data string, which is obtained by shifting the series of data string by a 6/8 word, to be stored in a fourth vector register in a state of being packed in units of 1-word, as fourth vector data corresponding to an element A [i+2];

a third vector shift double instruction to cause a part of a data string, which is obtained by shifting the series of data string by a 5/8 word, to be stored in a fourth vector register in a state of being packed in units of 1-word, as fourth vector data corresponding to an element A[i+3];

a fourth vector shift double instruction to cause a part of a data string, which is obtained by shifting the series of data string by a 4/8 word, to be stored in a fifth vector register in a state of being packed in units of 1-word, as fifth vector data corresponding to an element A[i+4];

a fifth vector shift double instruction to cause a part of a data string, which is obtained by shifting the series of data string by a 3/8 word, to be stored in a sixth vector register in a state of being packed in units of 1-word, as sixth vector data corresponding to an element A[i+5];

a sixth vector shift double instruction to cause a part of a data string, which is obtained by shifting the series of data string by a 2/8 word, to be stored in a seventh vector register in a state of being packed in units of 1-word, as seventh vector data corresponding to an element A[i+6]; and a seventh vector shift double instruction to cause a part of a data string, which is obtained by shifting the series of data string by a 1/8 word, to be stored in an eighth vector register in a state of being packed in units of 1-word, as eighth vector data corresponding to an element A[i+7].

7. A compile method of converting a primitive program for iterative calculation processing of executing an arithmetic calculation including, as operands, an element A[i], an element A[i+1], and an element A[i+2k] of an array A of a $(1/2)^k$ word type (k being a natural number) while shifting a value of a subscript i (i being an integer greater than or equal to 0) by one, into an object code, the compile method comprising:

generating a first vector load instruction to load a first group of data units, which is used as the element A [i] in the iterative calculation processing of executing the arithmetic calculation and has each data unit being a $(1/2)^k$ word, from a memory into a first vector register in a state of being packed in units of 1-word, as first vector data, and a second vector load instruction to load a second group of data units, which is used as the element A[i+2$^k$] in the iterative calculation processing of executing the arithmetic calculation, from the memory into a second vector register in a state of being packed in units of 1-word, as second vector data; and generating a first vector shift double instruction to cause a part of a data string, which is obtained by shifting the first vector data and the second vector data by a $(1/2)^k$ word as a series of data string, to be stored in a third vector register in a state of being packed in units of 1-word, as third vector data corresponding to the element A[i+1].

8. A non-transitory computer readable medium configured to store a control program for causing a compile device to execute a compile processing for converting a primitive program for iterative calculation processing of executing an arithmetic calculation including, as operands, an element A[i], an element A[i+1], and an element A[i+2k] of an array A of a $(1/2)^k$ word type (k being a natural number) while shifting a value of a subscript i (i being an integer greater than or equal to 0) by one, into an object code, the compile processing including:

generating a first vector load instruction to load a first group of data units, which is used as the element A[i] in the iterative calculation processing of executing the arithmetic calculation and has each data unit being a $(1/2)^k$ word, from a memory into a first vector register in a state of being packed in units of 1-word, as first vector data, and a second vector load instruction to load a second group of data units, which is used as the element A[i+2$^k$] in the iterative calculation processing of executing the arithmetic calculation, from the memory into a second vector register in a state of being packed in units of 1-word, as second vector data; and generating a first vector shift double instruction to cause a part of a data string, which is obtained by shifting the first vector data and the second vector data by a $(1/2)^k$ word as a series of data string, to be stored in a third vector register in a state of being packed in units of 1-word, as third vector data corresponding to the element A[i+1].

* * * * *